Dec. 5, 1950 F. J. DITTER 2,532,610
AIRCRAFT SKI
Filed July 9, 1948 3 Sheets-Sheet 1
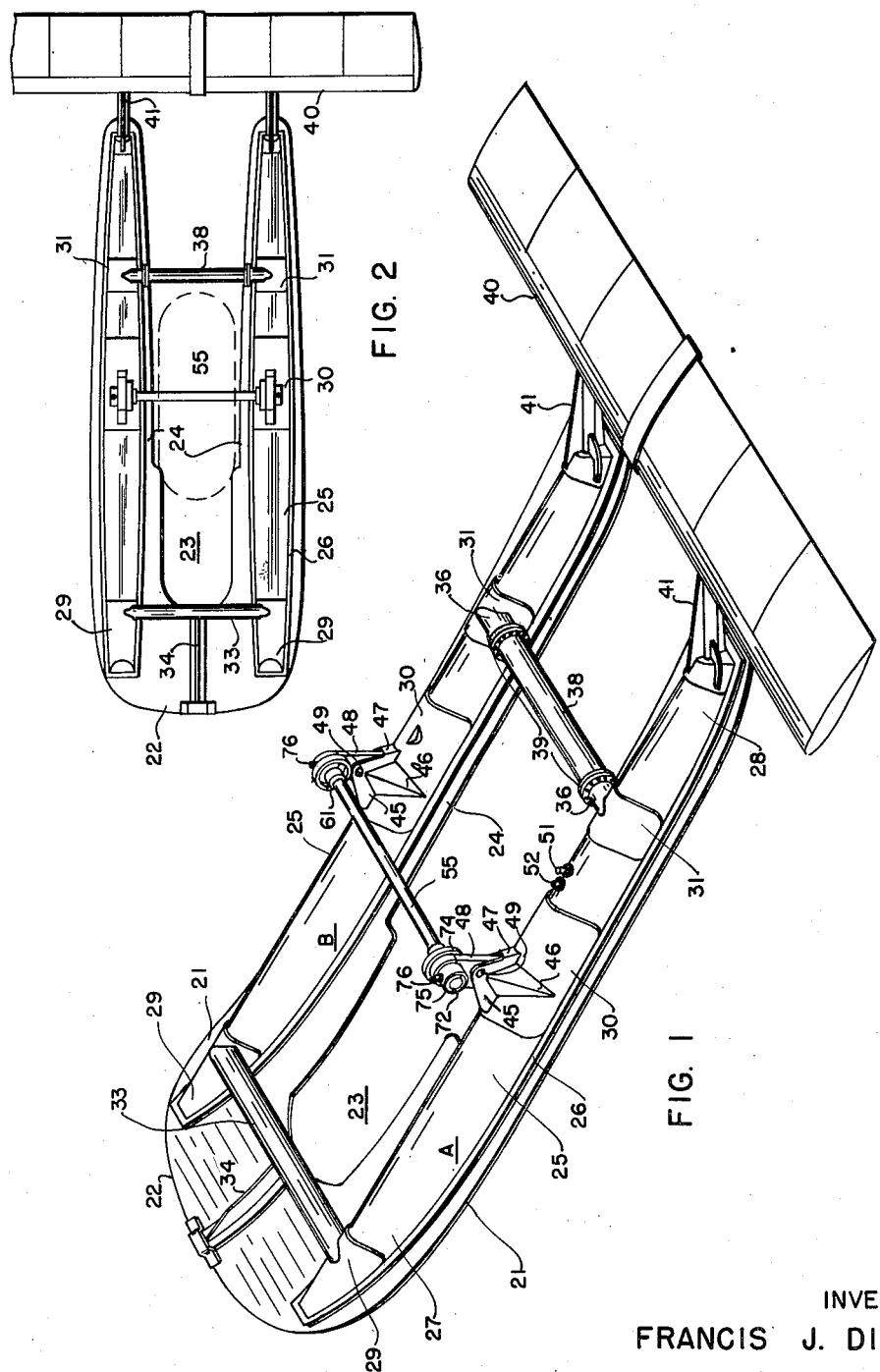
INVENTOR
FRANCIS J. DITTER
BY Anthony A. Juettner
ATTORNEY Dec. 5, 1950 F. J. DITTER 2,532,610
AIRCRAFT SKI Filed July 9, 1948 3 Sheets-Sheet 2

INVENTOR
FRANCIS J. DITTER
BY Anthony A. Juettner
ATTORNEY

Dec. 5, 1950  F. J. DITTER  2,532,610
AIRCRAFT SKI

Filed July 9, 1948  3 Sheets-Sheet 3

INVENTOR
FRANCIS J. DITTER
BY Anthony A. Juettner
ATTORNEY

Patented Dec. 5, 1950

2,532,610

UNITED STATES PATENT OFFICE 2,532,610

AIRCRAFT SKI

Francis J. Ditter, Minneapolis, Minn.

Application July 9, 1948, Serial No. 37,895

13 Claims. (Cl. 244—108)

The present invention relates to an aircraft ski and more particularly to an aircraft ski which is retractable relative to the wheel shaft of the conventional landing gear of the airplane.

Heretofore, aircraft skis have been mounted on the wheel shaft of the airplane and for this purpose it has been customary to remove the wheel of the landing gear and to replace the wheel with a ski which was mounted upon the wheel shaft. This procedure has not been unduly cumbersome in the case of small aircraft which are relatively easy to lift such that the landing wheel may be removed and the ski substituted without undue difficulty. This, however, has been somewhat inconvenient. In the case of heavier and more complicated aircraft landing gear, however, the change from wheel landing gear to skis has been much more cumbersome. Convenient apparatus for supporting a heavy aircraft for the purpose of changing from wheels to skis may not be available in various outlying airports. Moreover, the structure of such landing gears is usually quite complicated, and it would involve a considerable amount of work to remove a landing wheel and to substitute an aircraft ski.

Furthermore, aircraft equipped with only a single type of landing device is limited to operation under conditions for which such landing device is adapted. Thus a plane equipped with wheels only is limited to takeoff and landing on surfaces permitting the use of wheels. Likewise, a plane equipped solely with skis is limited to operation on snow or ice covered fields. A further limitation arises for example when it is desired to move a plane from a hangar to a snow covered field for take off. Under the usual circumstances it is necessary to have wheels in place for the purpose of moving the plane to the snow covered field, at which point the wheels may be removed and skis applied.

It has been found desirable, therefore, to devise a mechanism whereby the aircraft wheel may be allowed to remain on the wheel shaft of the conventional landing gear and to provide an auxiliary shaft on which the ski may be mounted, such shaft being movable relative to the wheel shaft so that both ski and wheel may be mounted on the aircraft at the same time, and such that it is possible to move one landing device from an inoperative position into an operative position without the necessity of removing the other landing device. This movement of the auxiliary shaft relative to the wheel shaft may be effected mechanically by suitable means controllable by the pilot from the cockpit, or may be effected by various means operative from a position on the ground as will be described more fully hereinafter.

By this means it is possible to readily shift the skis from an inoperative to an operative position and vice versa. Thus it is possible to have the wheels in position for moving the plane from the hangar to the field at which point the switch from wheels to skis may be readily accomplished. In those instances in which the relative movement of the skis is controllable from the cockpit it will be apparent that the switch from wheels to skis or vice versa may actually be effected during flight such that it is possible to take off on one type of landing device and to land on the other type. It is also possible as will be seen hereinafter to adjust the relative position of the ski and to lock it in that position so that takeoffs and landings may be effected on any type of surface whether dry or covered with snow or ice. This is accomplished by having the wheel protrude below the ski sufficiently that the wheel will bear the load without the ski contacting the landing surface when landing is effected on a dry surface or on one on which the snow or ice is solidly packed. On surfaces covered with loose snow the protruding wheel will pack the snow sufficiently that the ski contacts the snow and actually bears most of the load.

It has also been found desirable to provide an aircraft landing ski of a divided nature such that a part of the ski is on each side of the landing wheel. This is particularly useful in the case of large aircraft in which the necessary area of a ski is large, and where it is desirable to apply the load to the ski as close as possible to existing shock absorbing devices.

It is, therefore, an object of the present invention to provide a novel aircraft ski so constructed that it can be mounted on the landing gear of the aircraft while the landing wheels are in position, such that the ski may be moved into and out of operative position without affecting the position of the landing wheel.

It is a further object of the present invention to provide such an aircraft ski in which the ski is movable from an operative into an inoperative position and vice versa by means of controls from a remote point.

It is a further object of the invention to provide such an aircraft ski in which the ski is movable from operative to inoperative position and vice versa by manual means on the ground.

It is a still further object of the present invention to provide a novel ski of divided structure which surrounds an aircraft wheel, such that the ski and the wheel may be in position on the aircraft landing gear simultaneously, and that the weight is distributed directly beneath the conventional shock absorbing equipment.

The invention will be more fully apparent from the following description of the invention with particular reference to the drawings in which Figure 1 is a perspective illustrating a preferred embodiment of the invention, showing the divided ski structure and the application to this structure of the mechanism for moving the ski into and out of operative position while the wheel is in position on the wheel shaft;

Fig. 2 is a plan view of the ski illustrated in Figure 1;

Figure 5:
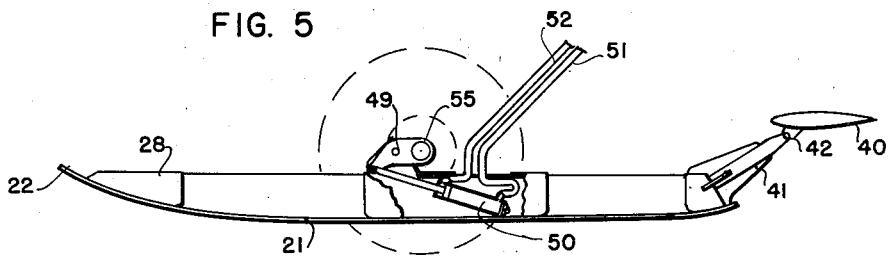
Figs. 5 and 6 are side elevations partly in section illustrating the position of the ski relative to the wheel in the two limit positions of movement of the ski relative to the wheel.

With reference to Figures 1 and 2, the ski is composed of two sections A and B, which are of a generally similar nature. The ski is generally constructed in accordance with the disclosure of my copending application Serial No. 706,883, filed October 31, 1946, entitled Aircraft Ski. In accordance with the teachings of that application, the ski is composed of a base shoe 21, which preferably is of relatively heavy gauge sheet metal, preferably aluminum or magnesium, although other materials such as plywood may be used. This base shoe has a contour of a generally U-shaped nature as shown in the plan view of Fig. 2. The front end of the ski 22 is in the position of the base of the U and is upturned somewhat for the purpose of climbing on top of snow and gradually packing it down. This toe of the ski extends backward a short distance and then the sheet is cut out as indicated by space 23 which is forward of the normal position of the wheel. The base of the ski is preferably cut out further at 24 to provide maximum clearance for the wheel. The cut-out space 23 forward of the wheel serves the following purpose. As the ski travels along snow-covered ground, it is found that a considerable quantity of snow blows over the top of the front end of the ski and would normally tend to pile up in the space 23 were the base of the shoe continuous across this space. It is found that by having this space cut out, the snow may fly over the toe of the ski and down into space 23 and is then packed by the oncoming wheel. In this way it is found that relatively little snow piles up on the ski and thus excess weight during flight is avoided.

Superimposed on the base shoe are a pair of inverted channel members 25, which preferably have an inverted V cross-section with side flanges 26 extending outwardly from the ends of the V. The inverted V-shaped channels are preferably formed such that the base of the V forms a substantially straight line along the length of the ski and the outer ends of the V are cut short as indicated at 27 and 28 at the toe and heel of the ski respectively. This is for the purpose of adapting the channel member to the contour of the base shoe which curves upwardly both at the toe and heel. The base shoe may be curved substantially continuously longitudinally, but the curvature is more pronounced at the toe and heel. In larger skis the intermediate section of the ski's length may be substantially flat, whereas in smaller skis it may be desirable to have the base shoe in a more or less continuous curve.

The inverted channel members may be attached to the base shoe in any suitable manner as by rivets passing through flanges 26 and through the base shoe, by spot-welding, bolting, or in any other suitable manner. The various structural elements of the ski may be attached to these channels through saddle members 29, 30, and 31, respectively. The saddle members 29 correspond to the shape of the channel member at this point and are principally for the purpose of reinforcing the channel at this point and for distributing load over a wider section of the channel. A front tie member 33 extends from one side of the ski to the other and is attached to the saddle members 29. The saddle members 29 may be of steel and the tie member 33 may likewise be of steel and attached to the saddle by means of welds. It is apparent, however, that the material of construction of members 29 and 33 may be varied and if desired these may also be constructed of light metals such as aluminum or magnesium, and other means of fastening may be employed. A reinforcing member 34 may be attached to the base shoe and the tie member 33 to strengthen the structure at this point.

Saddle members 31 are provided with lateral tubular sections 36 which extend inwardly between the two sections A and B of the ski. Sections 36 terminate inwardly in flanges to which may be attached flanges on tubular section 38. These flanges are preferably bolted together such that they may be readily removed for a purpose to be described hereinafter.

The ski may be rigged for its position in flight and during taxiing operations in any suitable manner. In Figures 1 and 2, I have illustrated the use of an airfoil 40 for this purpose. This airfoil is supported by a pair of brackets 41 extending upwardly from the heel end of the sections A and B. This is in accordance with the teachings of my copending application Serial No. 779,173, filed October 10, 1947, entitled Rigging for Aircraft Ski. The airfoil is preferably supported on the brackets 41 by bolts 42 (Figs. 5 and 6), in order that the airfoil may be readily removed for a purpose to be described later.

Figure 3:
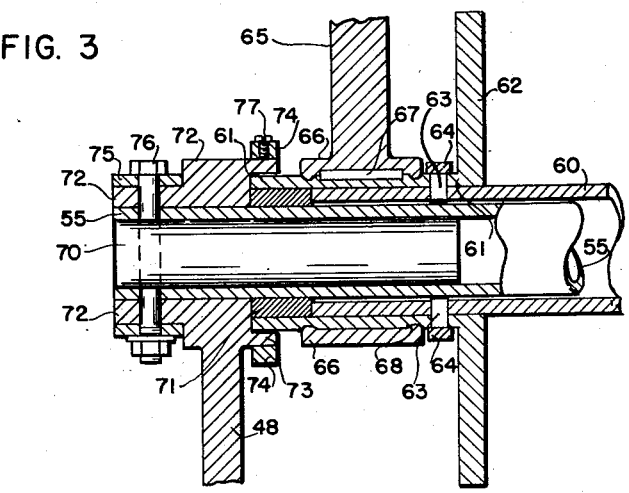
Fig. 3 is a fragmentary cross-section of the hub showing a means for mounting the ski on the wheel shaft.
Figure 4:
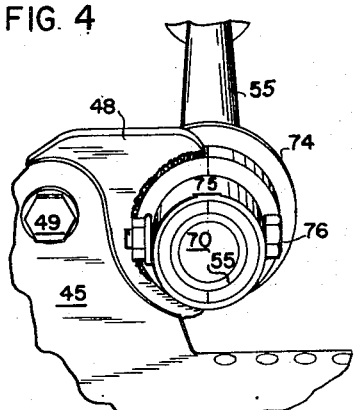
Fig. 4 is a fragmentary perspective of the hub shown in Fig. 3 and is an enlarged fragmentary view of the hub shown in Figure 1.

The ski is attached to the aircraft landing wheel shaft as follows. The saddles 30 are provided with upstanding flanges 45 which in turn are suitably braced laterally by members 46. The channels 25 are cut away in the area enclosed by the pair of flanges 45 and the end flanges 47. A lever arm 48 extends down between the pair of flanges 45 and is suitably pivoted therebetween by means of pivot 49. The lever arm 48 in section A extends down into the channel member 25 and the lower end of the arm is connected to a hydraulic cylinder generally indicated at 50 in Figs. 5 and 6. This hydraulic cylinder is connected to a hydraulic system through leads 51 and 52 which may extend to controls in the cockpit. In the ski illustrated in Figure 1, the lever arm 48 in section B need not necessarily be connected with a hydraulic cylinder for the following reason. The two lever arms 48 are connected by means of a shaft 55 which extends through the hollow wheel shaft of the aircraft and in this manner levers 48 may both be operated by a single hydraulic cylinder. The details of this structure are shown in Figs. 3 and 4. This shows the application of this ski to the conventional C-47 landing gear. The wheel shaft of this landing gear is illustrated as a hollow shaft 60. At each end of this shaft there is provided a sleeve 61 having an upstanding flange 62 for attachment to the brakes. The sleeve 61 extends somewhat beyond the end of wheel shaft 60. Conventionally sleeve 61 is attached to wheel shaft 60 by means of a pin which passes directly through the sleeve and through the wheel shaft, and inasmuch as the present arrangement provides for passing shaft 55 through the center of wheel shaft 60, this straight pin has been replaced by a pair of pins 63 which extend only through sleeve 61 and wheel shaft 60, thus leaving the entire area of the center of wheel shaft 60 for shaft 55. Pins 61 may be fastened to a split collar 64, the two halves of which are clamped together by means of suitable ears, thereby holding pins 63 in place. Sleeve member 61 is supported from the aircraft by means of supports 65 which in turn are connected to the shock gear of the airplane. Supports 65 terminate in a split hub section 66 which surrounds the sleeve 61 and which is keyed thereto by means of key 67. Hub section 66 may be provided with inwardly extending protrusions 68 which fit into corresponding grooves in the circumference of the sleeve 61 to prevent lateral displacement of the hub member. In this manner the wheel shaft 60 is held against rotation relative to brake flange 62 and relative to the supports 65.

Shaft 55 is illustrated as a hollow shaft extending through the hollow wheel shaft 60. For added shear strength at the outward end of shaft 55, it may be provided with a solid stub shaft 70, which extends inwardly for a suitable distance to carry the shear load. Shaft 55 is supported in the wheel shaft 60 by means of a bronze bushing 71 which may be pressed into the end of sleeve 61 beyond the termination of shaft 60. Lever 48 is provided with a split cap 72 which surrounds shaft 55. This split cap portion has a section 73 which extends over and partially surrounds the end of sleeve 61 but is spaced therefrom. The two halves of the split cap 72 are held in position by a retaining ring 74 which supports the two halves on the internal end and by a retaining ring 75 which surrounds a cut-down portion of the outward end of the split cap 72. Lever arm 48 is held from rotation relative to shaft 55 by means of bolt 76 which extends through the retaining ring 75 through the split cap 72 and through the shaft 55 and the stub shaft 70. Retaining ring 74 may be held in position by a series of set screws 77. For assembly purposes retaining ring 74 may be moved laterally adjacent the end of hub 66. Bolt 76 may be removed and retaining ring 75 slid off to make it possible to separate split cap 72, and thus permit removal of shaft 55.

Figure 6:
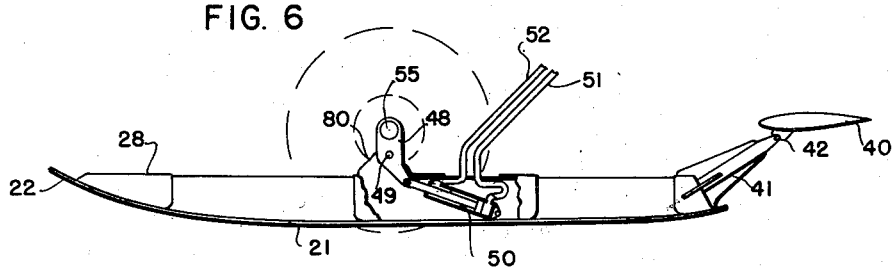

Figs. 5 and 6 illustrate cut-away side elevations of the ski of Figure 1 showing the ski in the two limit positions. In Fig. 5 the ski is retracted and the wheel extends through for contact with the landing surface. In Fig. 6 the ski is lowered and is in operative position for landing. A small segment of the wheel may extend below the ski surface in Fig. 6, but this readily compresses upon landing and the essential load is carried by the ski. This serves several purposes. The compression of the tire absorbs some of the shock of landing, for example on ice. Furthermore the protrusion of the wheel makes the brakes partially operable both for stopping and turning. The lower end of the hydraulic cylinder is pivotally attached to the base of the ski and is not movable longitudinally relative to the ski. Hydraulic lines 51 and 52 connect to the hydraulic system of the plane and to suitable controls located in the pilot's cockpit. It will be apparent that the introduction of hydraulic fluid into line 51 moves the piston from the position shown in Fig. 6 to the position shown in Fig. 5. Introduction of hydraulic fluid into line 52 and the venting of line 51 will result in the retraction of the piston from the position shown in Fig. 5 to the position shown in Fig. 6. It should be pointed out that in Fig. 5 the weight of the ski is supported by means of the fluid in the hydraulic cylinder. This is not an undue burden on the hydraulic system in view of the fact that the total weight of the ski may not be particularly great. In Fig. 6 the lever arm 48 meets stop 80 when the hydraulic cylinder is in the fully retracted position. It will be apparent, therefore, that since the thrust of the motor applies a forward thrust to shaft 55 and the drag of the ski provides a rearward thrust on the ski, that the load of the forward thrust will be taken by the lever arm 48 in contact with stop 80, and no thrust will be taken by the hydraulic system. It is evident, therefore, that this arrangement provides for a minimum load applied to the hydraulic system.

For purposes of mounting the ski on an aircraft, this may be accomplished very simply by removing the rigging airfoil 40 and by removing removable cross member 38. Shaft 55 and the structure associated therewith for mounting on the wheel shaft 60 may likewise be removed. The ski may then be moved backward into position about the wheel which is in position on its wheel shaft. Shaft 55 may then be slid through the center of wheel shaft 60. Retaining ring 74 may be slid onto the end of sleeve 61. The outside end of shaft 55 may then be placed in position on the split cap section of lever 48, after which the remaining portion of the cap may be applied. Retaining ring 74, may then be moved into position and secured by screws 77 and likewise retaining ring 75 may be placed over the outer end of the cut-down section of the split cap. Bolts 76 may then be placed through the entire assembly. Thereafter tie tube 38 may be bolted into position, as likewise may be the rigging airfoil 40, and the ski is in condition for operation. It will be apparent that saddles 39 may be provided with suitable access holes for the purpose of enabling one to get at the hydraulic cylinder for adjustment or maintenance.

For application of this type of ski to the wheel shaft of an aircraft landing gear in which the wheel shaft is solid or is too small so that it is not possible to pass the shaft 55 through the center of the wheel shaft, it is possible to provide a pair of hydraulic or pneumatic cylinders, in which event lever arms 48 would be identical. These cylinders may be connected to a divider which supplies identical quantities of fluid to each cylinder, in which case the levers would operate in unison and would be properly synchronized.

It is also possible to operate the levers 48 by means of a common electric motor which may be positioned in either section of the ski or in the cross-tube 33 or in a housing adjacent the cross tube. This single motor may be directly geared to each of the lever arms 48 and thus operate them in unison.

Figure 7:
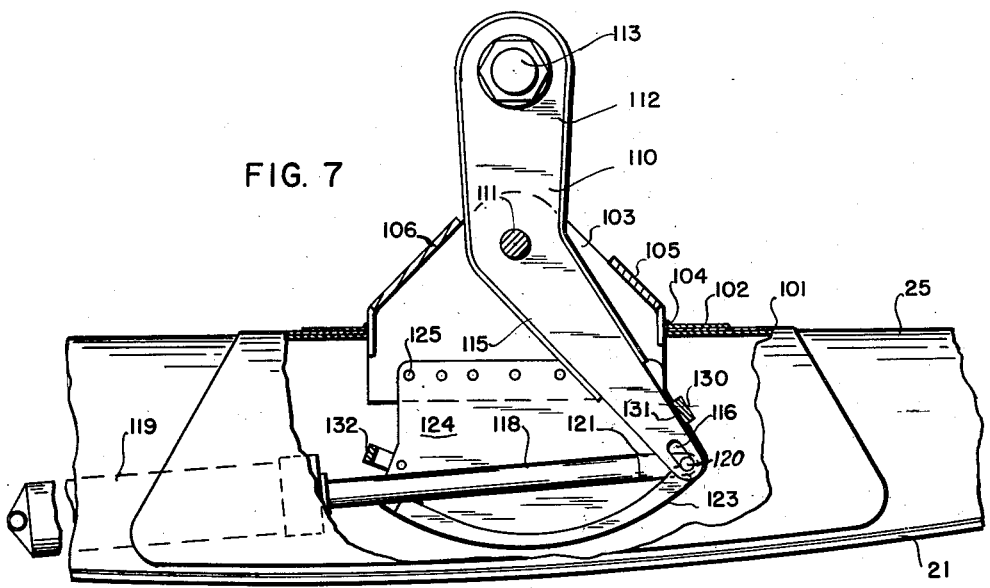
Fig. 7 is a fragmentary side elevation partly in section illustrating a modification of the invention and of means for locking the ski in its two limit positions.
Figure 8:
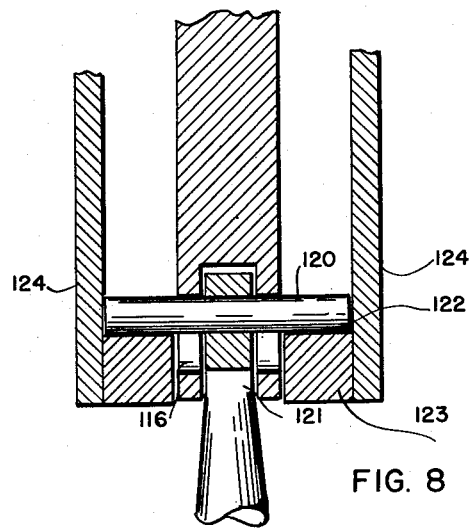
Fig. 8 is a cross-section of the locking mechanism of Fig. 7 illustrating the locking mechanism in an intermediate position.

With reference to Fig. 7, this illustrates a further embodiment of the invention in which means are supplied for locking the lever arm in its two limit positions. This figure shows the inverted channel member 25, the base shoe 21, and a modified saddle member 101, which conforms to the contour of the channel member 25 but has an opening therein along the ridge of the channel. Near the opening, the saddle 101 is reinforced by means of auxiliary saddle 102. A pair of saddle flange members 103 are inserted in the opening in the saddle 101 and suitably supported therein, as for example by means of welding 104. These two saddle flanges are spaced apart and are further supported in this spaced-apart position by means of side plates 105 and 106 which are suitably attached to the saddle flange members, as for example by means of welding. Lever arm 110 is pivoted about a pin 111 which passes through the lever arm and which in turn is supported in the saddle flanges 103. The lever arm is composed of an up-standing section 112 which is pivoted at its upper end in the wheel shaft 113 of the aircraft landing gear. The lever arm is provided with a lower section 115 which is offset somewhat from the upper section 112. This section of the lever arm is provided at its lower end with an elongated slot 116. As shown in Fig. 8, the lower section of the lever arm is bifurcated adjacent the elongated slot 116. The lower segment of the lever arm 110 is connected to the piston rod 118 of hydraulic cylinder 119 by means of pin 120. The lefthand end of the hydraulic cylinder 119 is pivoted to permit it to move in accordance with the dictates of the lever arm 115. The cut-down end 121 of the hydraulic piston rod is disposed between the two segments of the forked end of lever 110 and the pin 120 passes through the respective members. In the intermediate position of movement of the lever arm 110, the pin 120 rides on the upper edge 122 of guide members 123 which are arcuate in outline as shown in Fig. 7. Pin 120 is maintained in position by means of side plates 124 which are supported dependently from the saddle flanges 103 by means of rivets or bolts or welds 125. The guide members 123 are suitably supported by side plates 124.

The righthand end of the arcuate guide 123 is substantially parallel to the center line of the lower section 115 of lever arm 110. The lefthand end of arcuate guide 123 is likewise parallel to the center line of this lower section of the lever arm in the other limit position. In this manner any load applied to the pin 120 through the lever arm 115 will be normal to the end surface of the arcuate guide, and it will be apparent, therefore, that the lever arm will thus be locked in this position. It will also be apparent that piston rod 118 has a component of force in a direction along the center line of the lower section 115 of the lever arm toward the pivot 111 when the lever arm is in either of its two limit positions, and when force is applied to the piston rod to effect movement of the lever arm toward its other limit position. This component of force in the direction of pivot 111 is sufficient to raise the pin 120 in the slot 116 until it will ride along the top 122 of the arcuate guides 123. This position of the pin is illustrated in Fig. 8.

With further reference to Figs. 7 and 8, it will be apparent that the position of lever arm 115 in Fig. 7 is the position in which the skis are in operative position. The forward end of the ski is to the left in Fig. 7. The thrust of the motor on wheel shaft 113 is to the left, and accordingly this thrust is limited by means of stop 130 on side plate 124 when this stop comes in contact with the adjacent point 131 on the lower section 115 of the lever arm. In this manner there is no thrust on the hydraulic system or on the rod 118 to resist the thrust of the motor and the drag of the ski. The conditions on landing are the same as during take-off.

In the reverse position of the lever arm 110, that is, in which the lever arm is moved so that its lower end is in the limit position on the left in Fig. 7, the weight of the ski on the lever arm will be borne by the end of the arcuate guide 123 through the pin 120 and will not have to be borne by the hydraulic system. A stop 132 is provided adjacent the left hand limit position of the lever arm. When the lever arm hits this stop, further movement of the piston serves to move pin 120 into locking position at left end of arcuate guide. It is apparent, therefore, that by this means there has been provided a locking device for locking the ski in its two limit positions and for taking the thrust of the motor, the drag and the weight of the ski on the actual structural devices of the ski without applying any load on the actuating mechanism for changing the position of the ski. This locking device is of considerable importance in insuring that the ski will remain in whichever position it is during a take-off or landing operation and to prevent any change in the position of this ski at a time when change might be disastrous.

Figure 9:
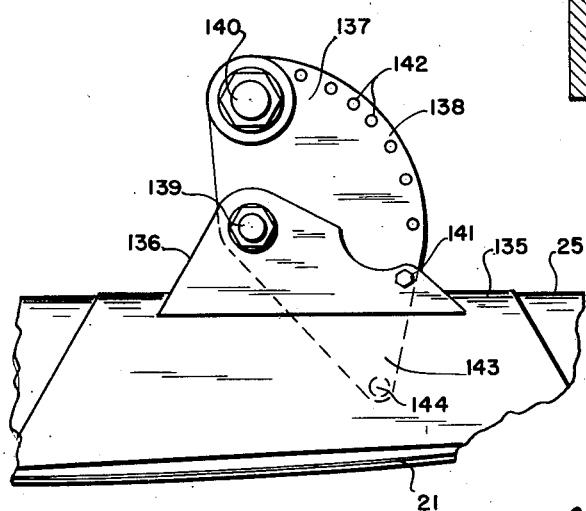
Fig. 9 is a fragmentary elevation of a further embodiment of the invention illustrating a simplified version thereof.

In Fig. 9 I have illustrated a further embodiment of the invention with means for locking the ski in any of the plurality of positions. The ski has the usual channel section 25 and base shoe 21. It may be provided with any suitable saddle 135 which again conforms to the contour of the channel 25. The saddle 135 may be cut out at or adjacent the base of the channel 25, and a pair of flange plates 136 suitably supported in the resultant opening. These flange plates may also be supported outside the channel where desired. A lever arm 137 having an arcuate segment 138 is pivoted at 139 to the flange plates 136. The lever arm 137 is provided with a hole for attachment to wheel shaft 140 of the aircraft landing gear. A locking hole having pin 141 therein is provided in the rearward end of the flange plates 136. A series of locking holes 142 are provided in lever arm 137 along the arc of a circle having a radius from pivot 139 to locking pin 141. It will be apparent that the lever arm may be adjusted to any desired position and locked in this position by means of pin 141 passing through the flange plates 136, through holes 142, and through the flange plate on the other side.

The lever arm 137 has been illustrated as having a lower section 143 having hole 144 therein for attachment to a suitable actuating device such as a hydraulic cylinder, if such actuating device is desired.

The adjustability of this structure is useful in the following instances. Under some circumstances landings and take-offs may be performed for a long period of time under constant conditions of either ice or snow or at other times under constant conditions of freedom from ice and snow. Under these circumstances, it may be desirable to adjust the ski to the position necessary for the operating conditions and to leave it in this position. On other occasions, however, it may be found that one may be taking off from an airport having ice or snow thereon and may be traveling to another airport which is free from this condition. Under these circumstances, it may be desirable to adjust the relative position of the ski such that the landing wheel protrudes below the surface of the ski a sufficient distance that it will take the load of the plane on landing on non-icy conditions. In this way it is possible to either take off or land on a dry airport. By carefully adjusting the ski, it is possible to have the ski take the load in the event that landing or take-off is attempted on an airport where any depth of snow is encountered. Under these circumstances, the fact that the wheel may protrude below the lower surface of the ski is not particularly disadvantageous inasmuch as the ski tends to take the major portion of the load and the tire will compress and thus permit the ski to take the larger portion of the load.

While various modifications of the invention have been described, it is to be understood that the invention is not limited thereto and that other modifications may be made without departing from the spirit thereof. For example, while illustrations in the drawings have been with particular reference to the divided ski arrangement, it is evident that the arrangement for the raising and lowering of the ski relative to the wheel shaft may be applied equally to single skis which are mounted on either side of a wheel. It is likewise apparent that while hydraulic cylinders 50 and 119 have been described, these may be pneumatic cylinders, or electrical or other screw jack devices.

I claim as my invention:

1. An aircraft ski having a pedestal intermediate the ends thereof, a lever arm pivoted on said pedestal and extending upwardly therefrom, means on the upper end of said lever arm for pivotally mounting said lever on the wheel shaft of an airplane said lever arm also extending downwardly from said pivotal connection on said pedestal and means on the ski for moving said lever arm about said pivot.

2. An aircraft ski comprising a base shoe, an inverted channel member supported thereon, a pedestal on said channel member, a lever arm pivoted intermediate its length on said pedestal, and means on one end of said lever arm for pivotally attaching it to the wheel shaft of an airplane.

3. An aircraft ski comprising a base shoe, an inverted channel member supported thereon, a pedestal supported on said inverted channel, a lever arm pivotally supported on said pedestal and extending through the base of said channel member into the internal portion of the ski, means at one end of said lever arm for attaching said arm to the wheel shaft of the landing gear of an airplane, and means on the end of said lever arm in the interior of said ski for rotating said lever arm about said pivot.

4. An aircraft ski comprising a base shoe, an inverted channel member supported thereon, a pedestal supported on the channel member, a lever arm pivoted intermediate its length on said pedestal, the lower end of said lever arm extending through the channel member into the interior of the ski, a hydraulic cylinder having one end pivotally attached to the ski, the other end pivotally attached to the lower end of the lever arm, the remaining end of said lever arm having means thereon for attachment to the wheel shaft of an airplane.

5. An aircraft ski comprising a pair of inverted channel members extending generally parallel, a base shoe of generally U-shaped form, the arms of the U extending beneath the inverted channel members and being attached thereto, the base of the U extending between the channel members at the forward end of said channel members, a removable support member extending from one channel member to the other near the rearward ends of said channel members, and means on said channel members for supporting an aircraft wheel therebetween.

6. An aircraft ski having a lever arm pivoted thereon, said lever arm being pivoted intermediate its length, means at one end of said lever arm for attachment to the wheel shaft of an airplane, means at the other end for movement of said lever arm about said pivot between two predetermined limits, and locking means for locking the lever arm at either of said limits.

7. An aircraft ski having a mounting pedestal intermediate its length, a lever arm pivotally mounted on said pedestal intermediate the length of the lever arm, means at one end of said lever arm for attachment to the wheel shaft of an airplane, means for rotating said lever arm about said pedestal pivot, and an abutment on said pedestal adapted to contact said lever arm to limit its movement in one direction.

8. An aircraft ski having a mounting pedestal thereon, a lever arm pivotally mounted on said pedestal, means on said lever for attachment thereof to the wheel shaft of an airplane, said lever arm having an arcuate segment, a plurality of locking elements along the edge of said arcuate segment and locking means supported on said pedestal and adapted to cooperate with said locking elements, whereby said lever arm may be locked in any of a plurality of positions.

9. An aircraft ski comprising a pair of inverted channel members extending generally parallel, a U-shaped base member having the arms of the U extending beneath the inverted channel members and attached thereto, the base of the U extending between the channel members at the forward end thereof, each of said inverted channel members having a pedestal mounted intermediate the length thereof, a pair of lever arms, one mounted in each of said pedestals, one end of one of said lever arms extending through the channel member into the interior of the ski, a shaft rigidly connected to the outwardly extending ends of the lever arms, and means within said channel section for actuating said one of said lever arms and rotating it relative to said pivot.

10. An aircraft ski comprising a base shoe, an inverted channel member supported on said base shoe, an opening in said channel member at the base thereof, support means mounted in said opening and extending upwardly from the base of the channel, a lever arm supported intermediate its length on said support member, a portion of said lever arm extending upwardly from said pivot and having at its uppermost end means for attachment to the wheel shaft of an airplane, the lower portion of the lever arm extending through the opening in the channel into the interior of the ski and being pivotally connected at its lower end to an actuating means, said pivotal connection including a pin passing through the actuating means and through an elongated slot in the lower end of the lever arm, said elongated slot extending generally along the center line of the lower section of the lever arm, arcuate guide means for said pivot pin, said arcuate guide means having a radius less than the distance from the intermediate pivot of the lever arm to the outward end of the elongated slot, the ends of the arcuate guide being substantially parallel with the center line of the lower portion of the lever arm at its corresponding limit of movement.

11. An aircraft ski according to claim 10 in which the lower end of the lever arm is bifurcated and the end of the actuating means is disposed between the bifurcations of the lever arm and the pivot pin extends through the entire assembly, and in which the pin is free for rolling movement relative to the actuating means, the bifurcated lever arm, and the arcuate guide, the pin being held against lateral displacement by plates disposed adjacent the arcuate guide.

12. An aircraft ski assembly comprising a hollow wheel shaft, an inner shaft passing through said hollow wheel shaft, a pair of ski sections extending generally parallel, a pair of lever arms, one of said lever arms being pivotally supported on each of said ski sections, one end of each of said lever arms being attached to said inner shaft.

13. An aircraft ski according to claim 12 in which one of said lever arms extends below said pivot and has attached to the lower end thereof means for moving said lever arm about said pivot.

FRANCIS J. DITTER.

REFERENCES CITED

The following references are of record in the file of this patent:

UNITED STATES PATENTS

| Number | Name | Date |
|---|---|---|
| 1,844,295 | Perry | Feb. 9, 1932 |
| 2,340,080 | Ringnel | Jan. 25, 1944 |

FOREIGN PATENTS

| Number | Country | Date |
|---|---|---|
| 71,226 | Sweden | Feb. 24, 1931 |